United States Patent
Chen

(10) Patent No.: US 8,675,359 B2
(45) Date of Patent: Mar. 18, 2014

(54) PROTECTIVE COVER STRUCTURE

(76) Inventor: Tsan-Nien Chen, Taipei (TW)

( * ) Notice: Subject to any disclaimer, the term of this patent is extended or adjusted under 35 U.S.C. 154(b) by 27 days.

(21) Appl. No.: 13/564,241

(22) Filed: Aug. 1, 2012

(65) Prior Publication Data

US 2014/0036420 A1 Feb. 6, 2014

(51) Int. Cl.
*H04M 1/00* (2006.01)
*G06F 1/16* (2006.01)
*B65D 85/38* (2006.01)

(52) U.S. Cl.
USPC .................... 361/679.56; 455/575.8; 206/305

(58) Field of Classification Search
USPC ........ 361/679.56; 455/575.1, 575.8; 206/305, 206/320, 811
See application file for complete search history.

(56) References Cited

U.S. PATENT DOCUMENTS

| | | | |
|---|---|---|---|
| 5,388,692 A * | 2/1995 | Withrow et al. | 206/320 |
| 5,586,002 A * | 12/1996 | Notarianni | 361/679.26 |
| 6,594,472 B1 * | 7/2003 | Curtis et al. | 455/575.8 |
| 6,659,274 B2 * | 12/2003 | Enners | 206/305 |
| 6,980,777 B2 * | 12/2005 | Shepherd et al. | 455/90.3 |
| 7,069,063 B2 * | 6/2006 | Halkosaari et al. | 455/575.8 |
| 7,248,904 B2 * | 7/2007 | Gartrell et al. | 455/575.8 |
| 7,400,917 B2 * | 7/2008 | Wood et al. | 455/575.8 |
| 7,555,325 B2 * | 6/2009 | Goros | 455/575.8 |
| 7,558,594 B2 * | 7/2009 | Wilson | 455/550.1 |
| 7,623,898 B2 * | 11/2009 | Holmberg | 455/575.8 |
| 7,889,489 B2 * | 2/2011 | Richardson et al. | 361/679.32 |
| 7,891,220 B2 * | 2/2011 | Yen et al. | 70/63 |
| 7,907,394 B2 * | 3/2011 | Richardson et al. | 361/679.3 |
| 8,204,561 B2 * | 6/2012 | Mongan et al. | 455/575.8 |
| 8,295,043 B2 * | 10/2012 | Tai et al. | 361/679.56 |
| 8,395,894 B2 * | 3/2013 | Richardson et al. | 361/679.55 |
| 8,531,834 B2 * | 9/2013 | Rayner | 361/679.56 |
| 2002/0071550 A1 * | 6/2002 | Pletikosa | 379/433.01 |
| 2002/0079244 A1 * | 6/2002 | Kwong | 206/305 |
| 2002/0136557 A1 * | 9/2002 | Shimamura | 396/535 |
| 2002/0193136 A1 * | 12/2002 | Halkosaari et al. | 455/550 |
| 2003/0068035 A1 * | 4/2003 | Pirila et al. | 379/447 |
| 2003/0095374 A1 * | 5/2003 | Richardson | 361/681 |
| 2003/0184958 A1 * | 10/2003 | Kao | 361/683 |
| 2004/0014506 A1 * | 1/2004 | Kemppinen | 455/575.1 |
| 2005/0116003 A1 * | 6/2005 | Butler et al. | 224/604 |
| 2005/0139498 A1 * | 6/2005 | Goros | 206/320 |
| 2006/0186001 A1 * | 8/2006 | Anderson et al. | 206/320 |
| 2007/0158220 A1 * | 7/2007 | Cleereman et al. | 206/320 |
| 2008/0096620 A1 * | 4/2008 | Lee et al. | 455/575.8 |
| 2009/0009941 A1 * | 1/2009 | Hsu et al. | 361/681 |
| 2009/0084432 A1 * | 4/2009 | Kosmehl | 136/251 |
| 2009/0141436 A1 * | 6/2009 | Matsuoka et al. | 361/679.09 |
| 2010/0093412 A1 * | 4/2010 | Serra et al. | 455/575.8 |
| 2010/0104814 A1 * | 4/2010 | Richardson et al. | 428/156 |
| 2010/0203931 A1 * | 8/2010 | Hynecek et al. | 455/575.8 |
| 2012/0329535 A1 * | 12/2012 | Kuo | 455/575.8 |

* cited by examiner

*Primary Examiner* — Adrian S Wilson

(57) ABSTRACT

A protective cover structure includes a main body with an accepting space to form a frame structure. A lid engages with the main body at the bottom of the frame through corresponding buckling elements. A groove is respectively disposed on the peripheries of upper and lower surfaces of the main body, where the groove of the lower surface is used for coupling and securing a decorative bottom plate, and the groove of the upper surface couples with an annular decorative body. In use, a user first removes the lid from the main body, inserts an electronic device, and then tightly covers the lid onto the main body, thereby securely receiving the electronic device in the main body to protect the electronic device, and providing decorative effects through the configurations of the decorative bottom plate and decorative body.

5 Claims, 7 Drawing Sheets

US 8,675,359 B2

PROTECTIVE COVER STRUCTURE

BACKGROUND OF THE INVENTION

1. Field of the Invention

The present invention relates to a protective cover structure, and more particularly to a simplified protective cover for an electronic device.

2. Background

Cellular phones are electronic products that have evolved from wired devices to wireless ones. Current cellular phones have more and more functions than ever before. These functions include photography, game playing, video recording, alarm clocks, Internet access, SMS communication, etc., such that cellular phones has already become one of the most important facilities in daily life. For the protection of a cellular phone, a typical user outfits it with a rubber cover provided around the periphery thereof. The structure of such a conventional cover assumes a bowl-like shape such that buttons and devices configured on the periphery of a cellular phone are all wrapped by the cover, which interferes with operations of the cellular phone and adversely affecting ease of use. In addition, the surface of a conventional protective cover is aligned with the screen of the cellular phone such that the surface of the screen is easily worn or damaged when the cellular phone is inadvertently placed face down on a surface. Furthermore, a cellular phone encased by a conventional rubber cover is easily damaged when an impact force acts upon on it because the cover provides no cushioning and is in direct contact with the periphery and bottom surfaces of the cellular phone; consequently, the force of impact is directly transmitted to the cellular phone, leading to damage. Clearly, then, the structure of the conventional protective cover is poorly designed, leading to ineffective use.

SUMMARY OF THE INVENTION

To improve the defects of the conventional structures mentioned above, various embodiments of the present invention are proposed.

An object of the present invention is to provide a protective cover structure, capable of receiving an electronic device completely for the full protection of the electronic device through the buckling of a main body to a lid.

Another object of the present invention is to provide a protective cover structure that provides an aesthetically pleasing effect for an electronic device through the configurations of a decorative bottom plate and a decorative body.

To achieve the objectives of the present invention mentioned above, the protective cover structure includes a main body with an accepting space, allowing the main body itself to form a frame structure, in which two frame sides on a bottom of the main body are respectively formed with a buckling recess. A lid, in the form of a plate structure, has two ends that each respectively extend by way of a buckling projection that corresponds to a respective buckling recess, thereby allowing the lid to engage with the main body through the buckling recesses and projections to form an integral structure with the main body.

The lid may first be removed from the main body while the protective cover of is put into use. An electronic device is then inserted into the main body via the lid opening, and the lid is finally covered on the main body securely after the insertion, thereby providing protection for an electronic device.

To achieve other objectives of the present invention, a groove may be respectively disposed on peripheries of upper and lower surfaces, where the groove on the lower surface is used for the coupling of a decorative bottom plate, and the groove on the upper surface is used for the coupling of an annular decorative body. The decorative bottom plate and decorative body can be made of genuine leather or artificial leather, for example, and patterns and colors thereof may be made changed such that an electronic device provides a pleasing aspect through the configurations of the decorative bottom plate and decorative body when the electronic device is inserted in the main body.

The present invention can achieve the objectives of protecting and decorating an electronic device through only a single main body, a decorative bottom plate and a decorative body; the protective cover structure of the present invention is thus simpler, having few components compared to the conventional protective cover.

As a result, production costs and assembly times can be reduced.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
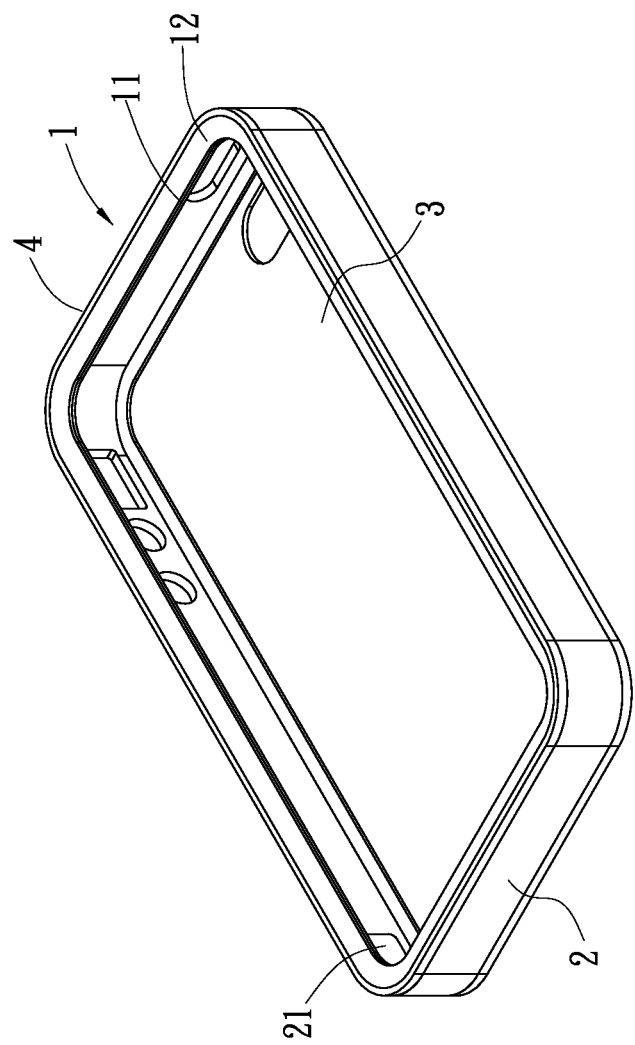
FIG. 1 is a perspective view of a protective cover structure of an embodiment of the present invention.
Figure 2:
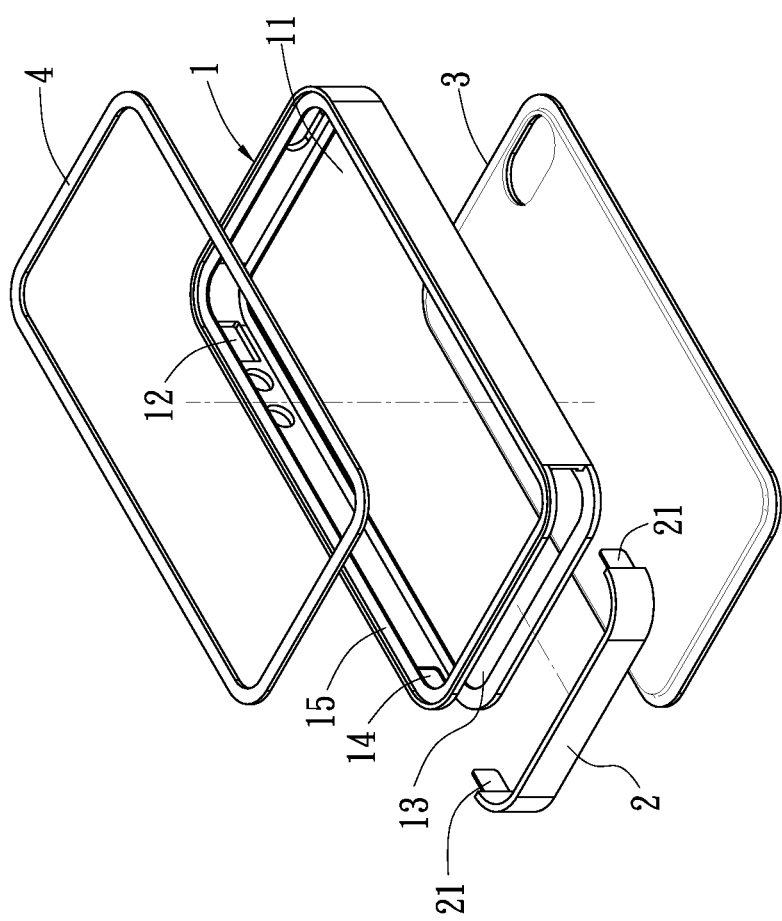
FIG. 2 is an exploded view of a protective cover structure of an embodiment of the present invention.

Referring to FIGS. 1 to 5, the figures are a perspective view and exploded view of a protective cover structure according to an embodiment of the present invention, and two exploded views and a cross sectional view of an embodiment decorative bottom plate. The protective cover structure primarily includes a main body 1, a lid 2, a decorative bottom plate and a decorative body 4.

The main body 1 can be made of plastic, and an accepting space 11 is formed inside the main body 1 causing the main body 1 to form a frame-like structure. A plurality of holes corresponding to the positions of buttons or speakers of an electronic device and are disposed on the side edges of the frame. In addition, an substantially U-shaped lid opening 13 is formed on the side edge of the bottom of the main body 1, where a buckling recess 14 is respectively disposed on the inner edges of each of the two sides of the lid opening 13 of the main body 1. Furthermore, a groove 15 is respectively disposed around each of the peripheral edges of the lower and upper surfaces of the main body 1, providing a stepwise structure to be formed between the groove 15 and the main body 1.

The lid 2 is a plate structure that is shaped to correspond to the lid opening 12 of the main body 1. Specifically, the lid 12 is a U-shaped body, and buckling projections 21 corresponding to the buckling recesses 14 of the main body 1 extend from each end of the lid 12, enabling the lid 2 to be secured to and engaged with the main body 1 by way of the buckling projections 21, thereby forming an integral or unified structure with the main body 1.

Figure 3:
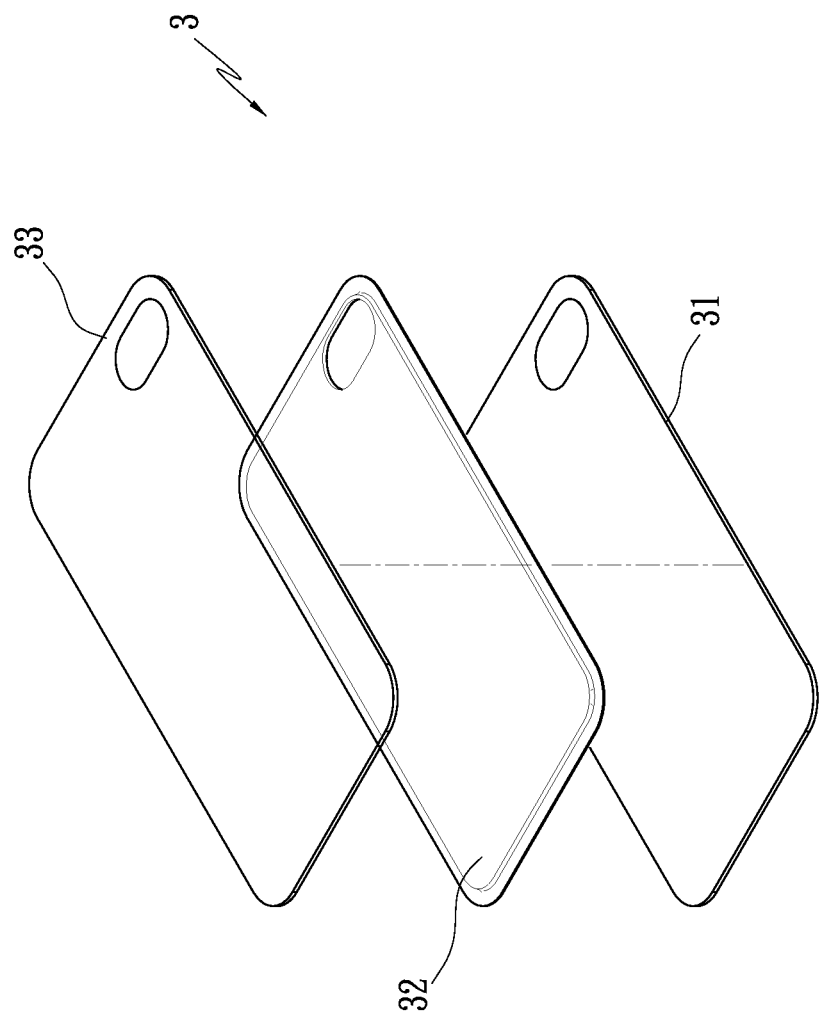
FIG. 3 is an exploded view of an embodiment decorative bottom plate of the present invention.
Figure 4:
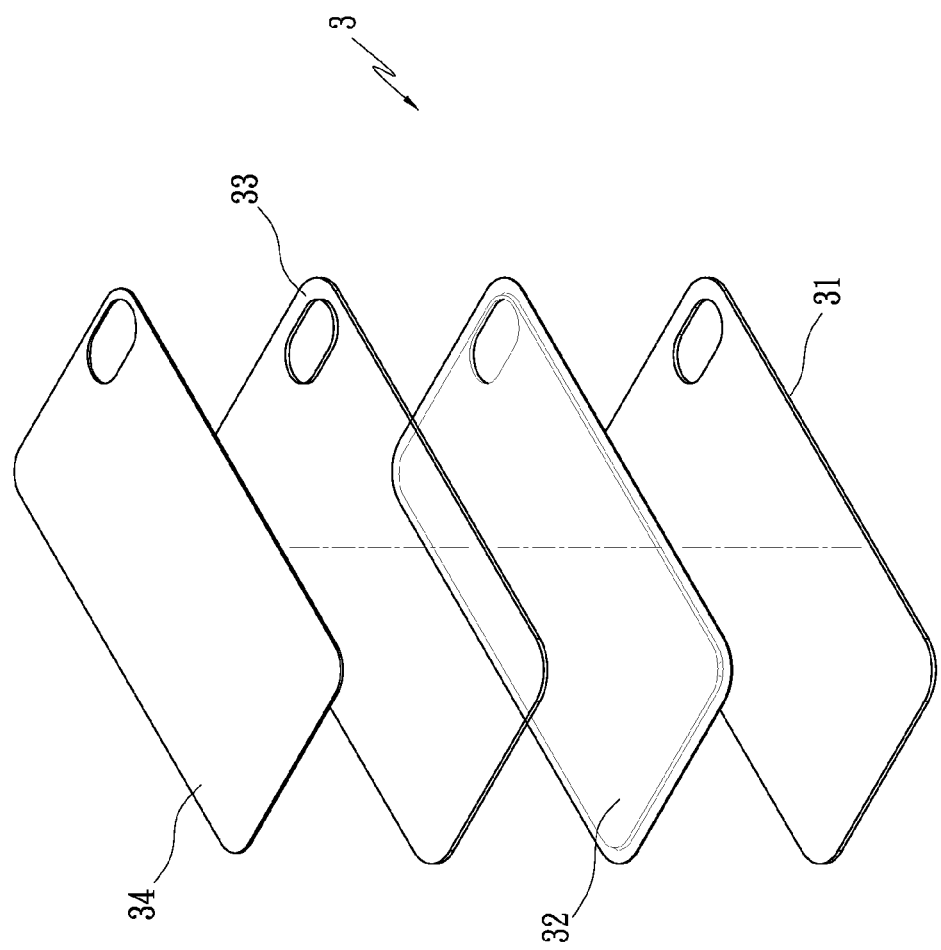
FIG. 4 is an exploded view of an embodiment decorative bottom plate configured with an extra inner pad according to the present invention.
Figure 5:
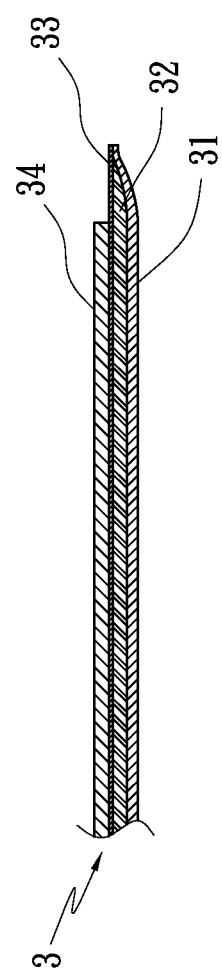
FIG. 5 is a cross-sectional view of a decorative bottom plate configured with an extra inner pad according to an embodiment of the present invention.

The decorative bottom plate 3 has a multilayer structure, formed by stacking at least an outer layer 31, a cushioning interlayer 32 and a supporting sheet 33 together as shown in FIG. 3. In addition, an inner pad 34 may even further be added on the supporting sheet 33, as shown in FIGS. 4 and 5. The outer layer 31 may be formed of genuine leather or synthetic leather, such as PV or PVC; the cushioning interlayer 32 may be formed from a styrene-butadiene rubber (SBR) shock-proof material; the supporting sheet 33 may be formed from a Polycarbonate (PC) plastic plate, and the inner pad 34 may be formed from an anti-slip film. The outer edge of the decorative bottom plate 3 is compatible with the groove 15 of the lower surface of the main body 1. The total height of the outer layer 31, cushioning interlayer 32 and supporting sheet 33, when stacked together, is almost the same as the depth of the groove 15 of the main body 1. In addition, the inner pad 34 of the decorative bottom plate 3 is compatible with the inner edge of the frame of the main body, allowing the decorative bottom plate to be attached to the groove 15 of the lower surface of the main body 1, and the decorative bottom plate 3 to form a plane with the lower surface of the main body after being attached to the main body 1.

The decorative body 4 is made of genuine leather or synthetic leather, and the structure of the decorative body 4 substantially corresponds to the structure of the groove 15 of the main body 1, allowing it to be an annular body such that the decorative body 4 can be attached to and secured in the groove 15 of the upper surface of the main body 1 and form a plane with the upper surface of the main body 1 after being attached to the main body 1.

Accordingly, various embodiments of the present invention can obtain the effect of embellishing the protective cover through the configurations of the decorative bottom plate and decorative body 4, while attaining the objective of protecting an electronic device through the configurations of the accepting space 11 of the main body 1 and the lid 2.

Figure 6:
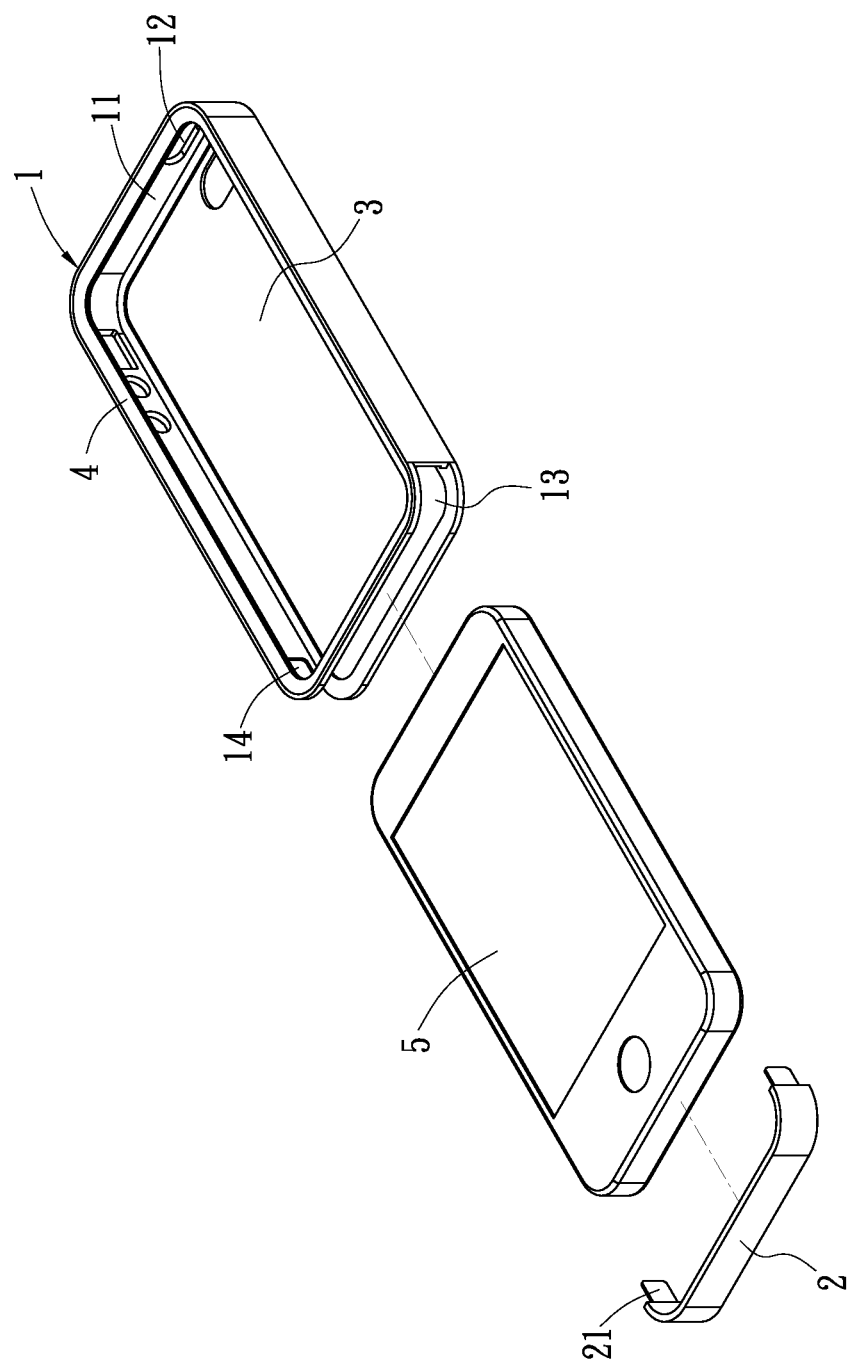
FIG. 6 is a perspective view of an embodiment protective cover structure of the present invention in use.
Figure 7:
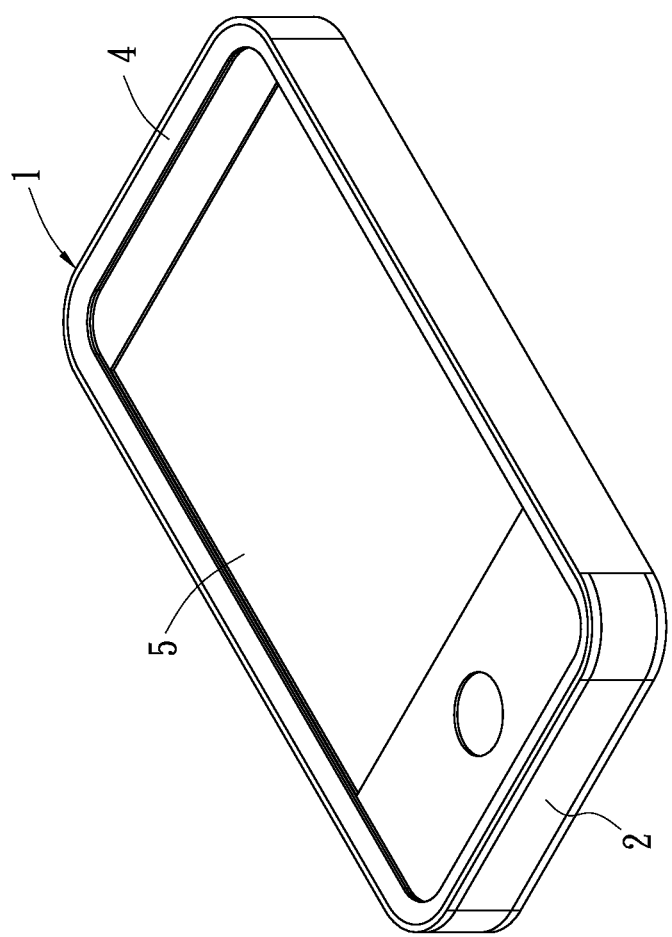
FIG. 7 is a perspective view of an embodiment of a protective cover structure of the present invention in which an electronic device is inserted.

Now, referring to FIGS. 6 and 7, the figures are perspective views of a protective cover structure of an embodiment of the present invention before and after an electronic device is inserted into it. When a protective cover structure is used, the lid 2 is first removed from the main body. An electronic device 5 is then inserted into the accepting space 11 of the main body 1 via the lid opening 13, and the lid 2 is then tightly coupled onto the main body 1 after the insertion. The upper surface of the electronic device 5 is provided a decorative aspect through the configuration of the decorative body 4, while the lower surface of the electronic device 5 is provided decoration through the configuration of the decorative bottom plate 3, thereby achieving the objectives of both protecting and embellishing the electronic device 5.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A protective cover structure, comprising:
   a main body having a frame structure with an accepting space, a lid opening formed on a bottom of said main body, a buckling recess being respectively formed on opposing sides of said main body at said opening, and a groove being respectively disposed on peripheries of upper and lower surfaces of said main body;
   a lid having buckling projections corresponding to said buckling recesses of said main body, the lid configured to cover said lid opening of said main body;
   a bottom plate having a multilayer structure and attached to and secured in said groove of said lower surface of said main body, the bottom plate formed by stacking together at least an outer layer, a cushioning interlayer, and a supporting sheet; and
   a decorative body attached to and secured in said groove of said upper surface of said main body.

2. The protective cover structure according to claim 1, wherein said main body or lid is made of plastic, said opening of said main body and said lid are respectively U-shaped structures, a plurality of holes corresponding to positions of buttons or speakers of an electronic device are disposed on side edges of said main body, and said grooves are disposed around said peripheries of said main body, each groove forming a stepwise structure with said main body.

3. The protective cover structure according to claim 1, further comprising an inner pad on said supporting sheet of said decorative bottom plate.

4. The protective cover structure according to claim 3, wherein an outer edge of said decorative bottom plate is shaped to correspond to said groove of said lower surface, a total height of said outer layer, cushioning interlayer and supporting sheet after being stacked together being substantially the same as a depth of said groove of said main body, and said inner pad of said decorative bottom plate is shaped to correspond to an inner edge of said frame of said main body, said decorative bottom plate forming a plane with said lower surface of said main body after being attached thereto.

5. The protective cover structure according to claim 1, wherein said decorative body is an annular structure made of genuine leather or synthetic leather, and forms a plane with said upper surface of said main body after being attached thereto.

* * * * *